(12) United States Patent
Son et al.

(10) Patent No.: US 6,172,760 B1
(45) Date of Patent: Jan. 9, 2001

(54) APPARATUS FOR MEASURING CHARACTERISTICS OF A REFLECTION-TYPE HOLOGRAPHIC OPTICAL ELEMENT

(75) Inventors: Jung Young Son, Kyunggi-do (KR); Vadim V. Smirnov, Saint-Petersburg (RU); Hyung Wook Jeon; Yong Jin Choi, both of Seoul (KR)

(73) Assignee: Korea Institute of Science and Technology, Seoul (KR)

( * ) Notice: Under 35 U.S.C. 154(b), the term of this patent shall be extended for 0 days.

(21) Appl. No.: 09/282,171

(22) Filed: Mar. 31, 1999

(30) Foreign Application Priority Data

Mar. 31, 1998 (KR) .................................................. 98-11253

(51) Int. Cl.[7] .................................................. G01N 21/47

(52) U.S. Cl. ............................................................ 356/446

(58) Field of Search ................................... 356/445, 446, 356/237.1, 239.1, 239.2

(56) References Cited

PUBLICATIONS

J. M. Heaton, et al., Applied Optics, vol. 24, No. 18, pp. 2931–2936, "Wavelength and Angular Selectivity of High Diffraction Efficiency Reflection Holograms in Silver Halide Photographic Emulsion", Sep. 15, 1985.

Herwig Kogelnik, The Bell System Technical Journal, vol. 48, No. 9, pp. 2909–2947, "Coupled Wave Theory for Thick Hologram Gratings", Nov. 1969.

*Primary Examiner*—Frank G. Font
*Assistant Examiner*—Michael P. Stafira
(74) *Attorney, Agent, or Firm*—Oblon, Spivak, McClelland, Maier & Neustadt, P.C.

(57) ABSTRACT

An apparatus for simultaneously measuring in real time for a reflection-type holographic optical element the wavelength of maximum diffraction efficiency, the angular and spectral selectivities, and the direction of the grating vector by analyzing the characteristics of the intensity distribution of the transmitted beam. A diverging or diffusive beam having an angle of divergence greater than the incident angle satisfying the Bragg condition of the holographic optical element under measurement. The apparatus comprises a multi-wavelength oscillation laser beam source, a beam diffuser, a objective lens, and an image projection screen.

17 Claims, 3 Drawing Sheets

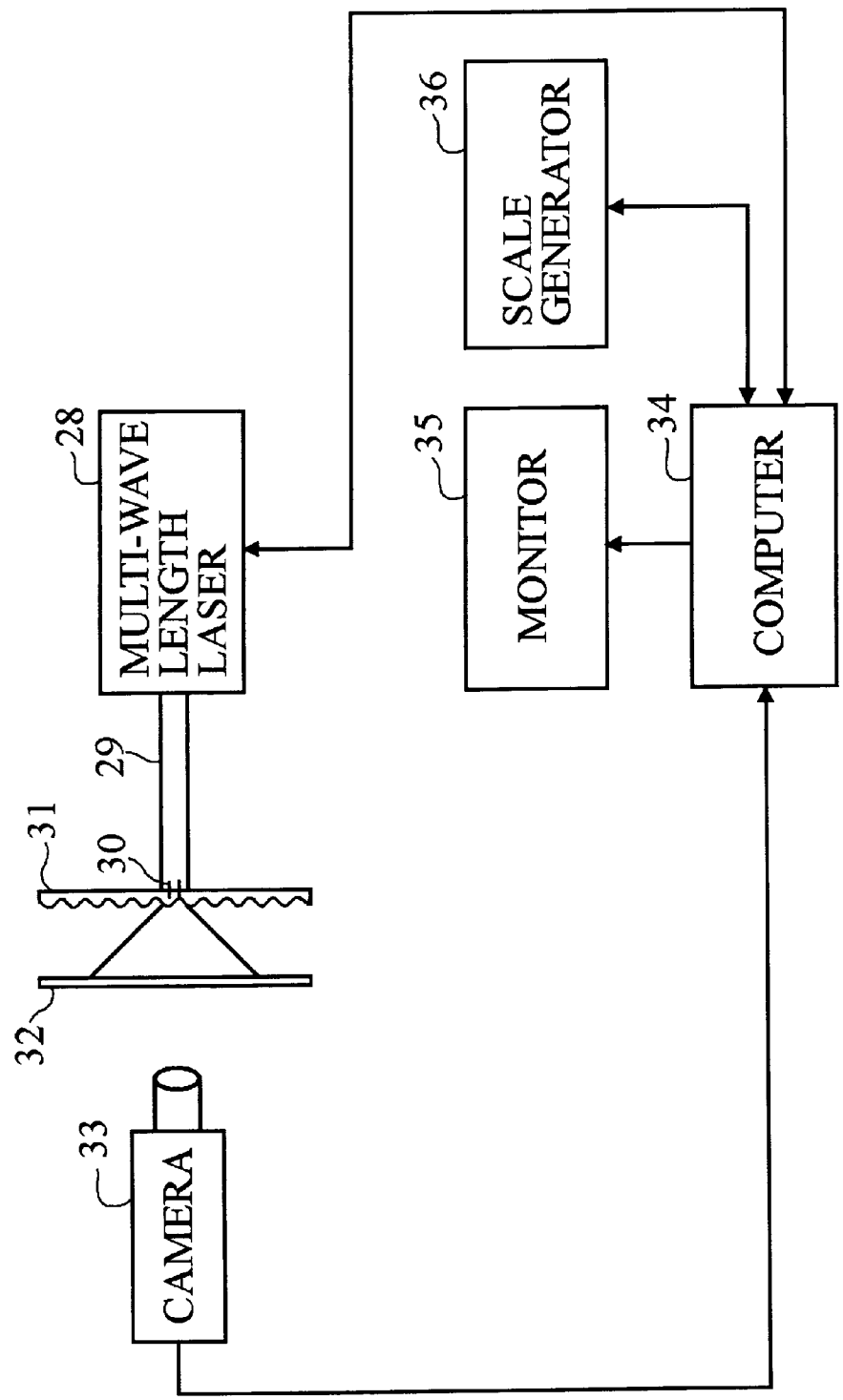

APPARATUS FOR MEASURING CHARACTERISTICS OF A REFLECTION-TYPE HOLOGRAPHIC OPTICAL ELEMENT

BACKGROUND OF THE INVENTION

1. Field of the Invention

The present invention relates to holography and, more particularly, to a simple optical apparatus for simultaneously measuring in real time the spectral and angular selectivities, the wavelength of maximum diffraction efficiency, and the direction of the grating vector of a reflection-type holographic optical element.

2. Description of the Related Art

A holographic optical element (HOE) is a hologram that is used to control transmitted light beams, rather than to display images. The angular and spectral selectivities of the HOE represent the deviation of incident angle satisfying the Bragg condition and the deviation of wavelength in the incident angle, respectively. Angular and spectral selectivities are measured, since reflection-type HOEs are used primarily as filters, beam combiner, and image display screens.

A conventional method for measuring angular and spectral selectivities involves measuring the diffraction efficiency for each wavelength or each incident angle by means of an instrument such as a monochrometer, a photodetector, or spectrophotometer. Conventional methods for measuring the angular and spectral selectivities:

(a) require a high-precision rotational or translational stage to control the angle of incidence of the beam incident on the HOE;

(b) require one detector to measure the spectral selectivity and another detector to measure the angular selectivity, because the position of the detector is fixed when the spectral selectivity is measured;

(c) cannot be used to tune an HOE in real-time, since the HOE must be rotated or repositioned after a measurement at a certain position or wavelength, both because the position or wavelength of an incident beam must be varied to measure the angular or spectral selectivity, respectively, and because whether HOE was tuned should be measured while swelling or shrinking its activity by wetting or heating for tuning HOE;

(d) are prone to error, since the beam on which measurements are made is not a collimated beam; and (e) cannot readily be employed when several grating vectors are present in one HOE.

SUMMARY OF THE INVENTION

Measurement of the characteristics of a reflection-type HOE according to the present invention is accomplished by means of a simple optical apparatus comprising a multi-wavelength laser, a beam diffuser, a wide-angle objective lens, a diffusive plate, and an optical imaging device, such as a charge coupled device. The apparatus of the present invention enables simultaneous measurement in real time of the angular and spectral selectivities and the direction of the grating vectors of the reflection-type HOE from analysis of the intensity distribution of the transmitted beam when a diverging diffusing beam is incident on the HOE. The measurement employs a diverging or diffusive beam having an angle of divergence greater than the incident angle satisfying the Bragg condition of the HOE.

BRIEF DESCRIPTION OF THE DRAWINGS

FIG. 3 is a schematic diagram of the apparatus for measuring the characteristics of an reflection-type HOE according to an embodiment of the present invention.

DETAILED DESCRIPTION OF PREFERRED EMBODIMENTS

The direction of a beam diffracted by an HOE is determined by the angle of incidence of the beam incident on the HOE within the range of incident angles satisfying the Bragg condition of the HOE, since the magnitude and direction of the grating vector of an HOE vary less than those of a hologram. A collimated beam incident on a reflection-type HOE is diffracted when the angle of incidence satisfies the Bragg condition.

When a diverging beam is incident on a reflection-type HOE with an angle of divergence greater than the incident angle satisfying the Bragg condition, the intensity distribution of the beam diffracted by the HOE is a dark ring of uniform width at the position of the diffracted beam and the diffracting angle. The radius of the ring is determined by the diffraction angle, while the width of the ring represents the angular selectivity at the wavelength of the incident beam. The spectral selectivity can be calculated from the angular selectivity.

Figure 1:
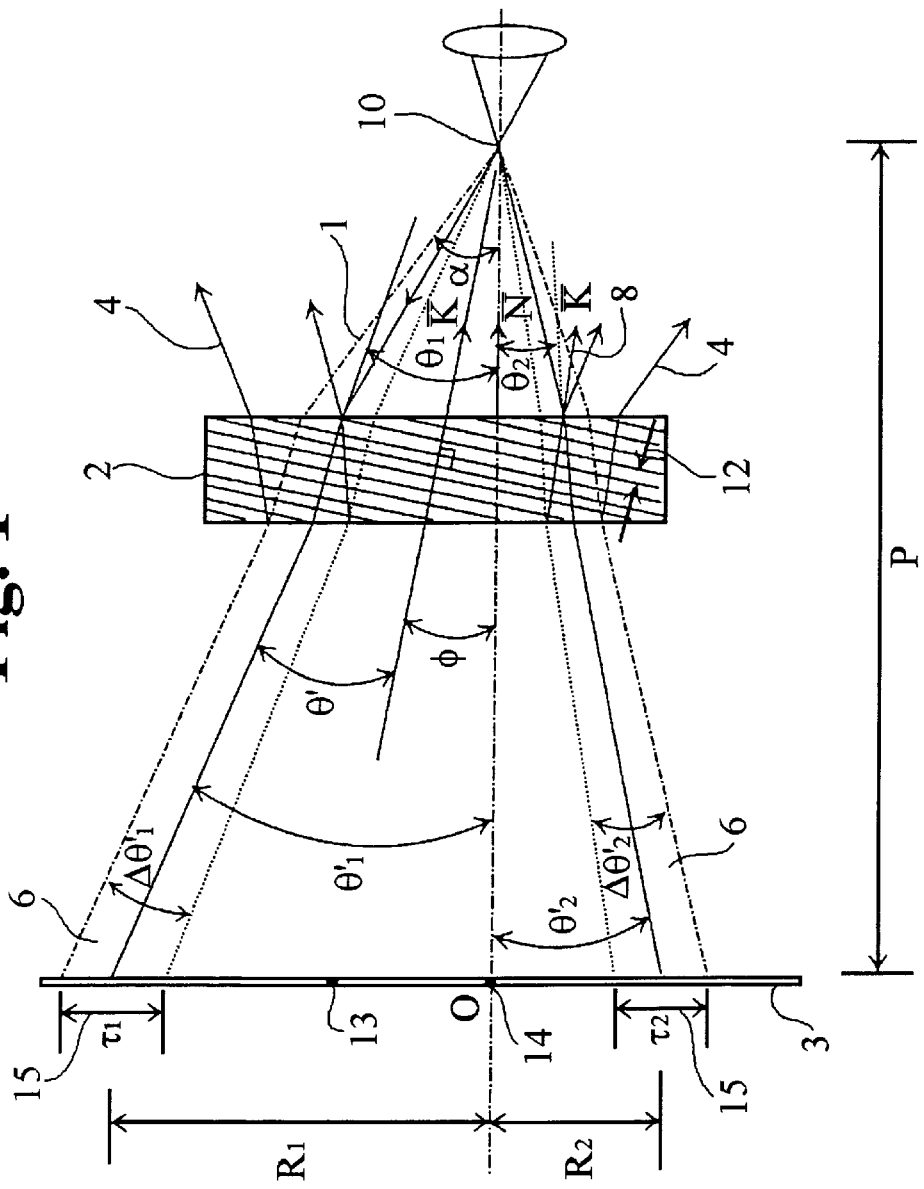
FIG. 1 illustrates the intensity distribution of the beam transmitted by a reflection-type HOE when a diverging laser beam is incident on the HOE according to an embodiment of the present invention.

FIG. 1 illustrates the ring pattern formed when a diverging laser beam illustrates a reflection-type HOE. A laser beam (1) having an angle of divergence α greater than the incident angle θ satisfying the Bragg condition plus angular selectivity illuminates an active layer (2) of a reflection-type HOE whose grating vector (8) makes an angle of φ with respect to the normal to the HOE surface. The transmitted beam again forms a dark ring pattern on a transparent diffusive screen (3) parallel to the HOE a distance P from the point source (10) of the laser beam, but the width of the ring is slightly nonuniform.

Under these circumstances, the center (13) of the ring is slightly above the center of the diverging beam pattern (14) along the line of intersection of the diffusive screen (3) and the plane defined by the grating vector (8) and the normal to the surface of the HOE. The width of the ring varies symmetrically, with the width of the upper side of the ring greater than the width of the lower side. The location of the center of the ring provides information about the direction of the grating vector and can be used to identify the relative orientation of a particular grating when multiple gratings having different orientations are used concurrently, as, for example, when an HOE used as a three-dimensional image projection screen.

The position of the center (13) of the ring and the direction in which the center of the ring moves represent the direction of the grating vectors and the magnitude of the difference between the normals to the HOE's surface, respectively. The width of the ring is obtained by multiplying the deviation of refraction angle $\Delta\theta'_1$ or $\Delta\theta'$ (hereinafter, $\Delta\theta'_{1 or\ 2}$) corresponding to the deviation of incident angles satisfying Bragg condition, i.e., angular selectivity $\Delta\theta_1$ or $\Delta\theta_2$ (hereinafter, $\theta_{1 or 2}$) by $P/\cos^2\theta_{1 or 2}$. If a laser beam having wavelength λ strikes on the active layer (2) of the HOE with an incident angle $\theta_{1 or 2}$, a dark ring forms where the extension of the incident beam intersects the diffusive screen (3). If the refraction angle is given as $\theta_{1or2}$;

$$\theta_{1or2} = \sin^{-1}\left(\frac{1}{n}\sin\theta'_{1or2}\right) \quad (1)$$

$$\tan\theta'_{1or2} = \frac{R_{1or2}}{P} \quad (2)$$

$$\theta_1 = \theta_2 + 2\phi \quad (3)$$

In equation (1), n is the refractive index of the active layer (2) of the HOE. According to Bragg condition, the grating period (12) $\Lambda$ of the active layer (2) is given by:

$$\Lambda = \frac{\lambda}{2n\cos(\theta_{1or2} \mp \phi)} \quad (4)$$

where the signs "−" and "+" correspond to $\theta_1$ and $\theta_2$, respectively. With a wavelength of $\lambda=2n\Lambda$, the diffraction efficiency has the maximum value. By combining equations (1), (2) and (4), $\Lambda$ may be written:

$$\Lambda = \frac{\lambda}{2n\cos\left[\sin^{-1}\left\{\frac{\sin(\tan^{-1}(R_{1or2}/P))}{n}\right\} \mp \phi\right]} \quad (5)$$

From equation (5), it is clear that the wavelength of a laser beam used to measure the characteristics of the HOE should not be larger than $2n\Lambda$, and that the smaller $\Lambda$, the larger $R_{1or2}$. The precision of the measuring method disclosed in the present application is enhanced by using several laser beams having different wavelengths. Grating vector K is given as follows:

The angular selectivity $\Delta\theta$ and the spectral selectivity $\Delta\lambda$ of $$|K| = \frac{2\pi}{\Lambda} \quad (6)$$

a hologram are related by:

$$\Delta\lambda \cong -\lambda\Delta\theta\tan(\theta_{1or2} \mp \phi) \quad (7)$$

From equation (1), $\Delta\theta$ is:

$$\Delta\theta_{1or2} = \frac{\cos\theta'_{1or2}}{\sqrt{n^2 - \sin^2\theta'_{1or2}}}\Delta\theta'_{1or2} \quad (8)$$

If $\Delta\theta$ is measured, $\Delta\lambda$ can thus be calculated from equation (7)

Figure 2:
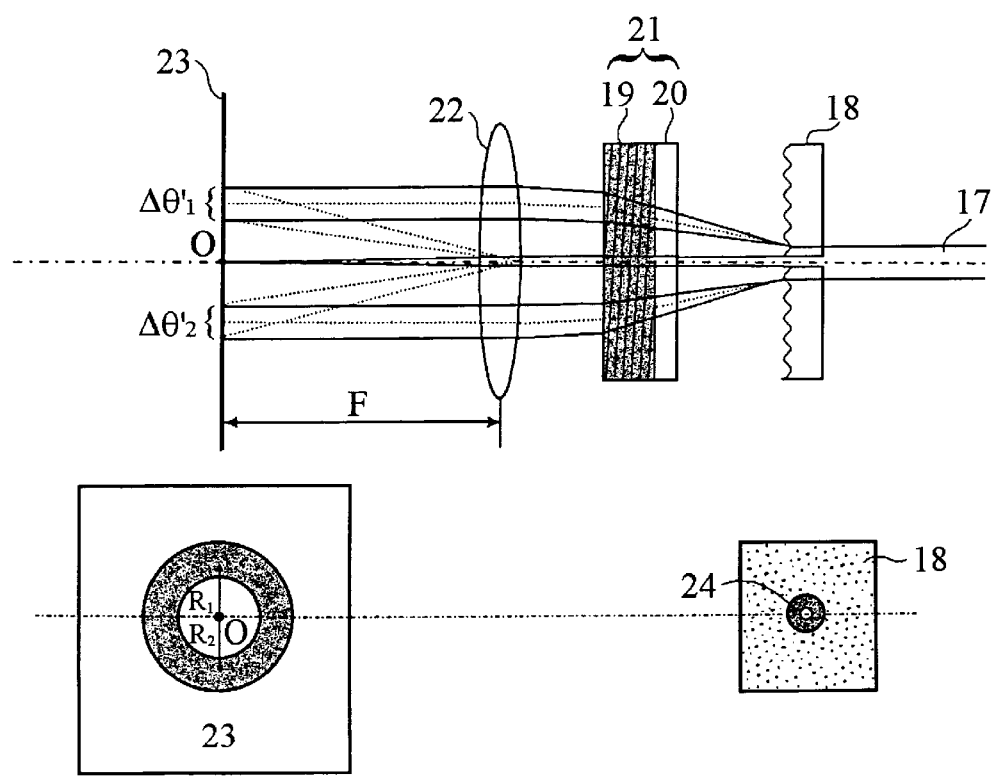
FIG. 2 illustrates the intensity distribution of the transmitted beam when a collimated laser beam which has passed through a diffusive plate is incident on the reflection-type HOE according to an embodiment of the present invention.

A diffusive plate(18) may be used instead of a diverging beam to measure the characteristics of a reflection-type HOE(21). As shown in FIG. 2, a collimated laser beam (17) illuminates an active layer (19) of the reflection-type HOE (21) through a diffusive plate(18) which is parallel to the active layer(19) and the transmitted beam is projected onto a screen(23) through an objective lens(22) which is also parallel to the active layer(19) and has a large numerical aperture. The diffused beam again forms a ring pattern on the image projection screen(23), as in FIG. 1. The position of the substrate(20) of the HOE does not affect the measurement.

When a diffusive plate(18) is used, the angle of divergence of the diffused beam should be greater than the sum of the angular selectivity and an incident angle satisfying the Bragg condition. Since the diffused beam can be considered a collection of collimated beams, the clearest image is formed in the focal plane of the objective lens.

A collimated laser beam(17) which passes through the diffusive plate(18) penetrates the HOE(21) vertically, passes through the center of the lens(22), and forms the center of the intensity distribution "o" on the diffusive screen(23) unless the substrate(20) of the HOE(21) is a wedge type. If there is a parasitic fringe of a reflective in the HOE(21), the beam which passes through the diffusive plate(18) is diffracted by the parasitic fringe and provides information about the existence of the parasitic fringe. If the grating recorded on the HOE(21) is not parallel to the surface, the center of the ring differs from the center of the intensity distribution. In equations (1) through (8), if P is replaced with the focal length F of lens(22), precise application is possible in the case of a diffusive plate(18). If the diffusive plate(18) is made of opal, the portion which a beam directly passes through is not necessary.

As shown in FIG. 3, a laser beam with a specific wavelength collimated from a multi-wavelength laser(28) illuminates a diffusive plate(31) having a non-diffusive portion (30) whose diameter is less than the diameter of the laser beam. The beam that passes through the diffusive plate(31) passes through the HOE(32) which is parallel to the diffusive plate(31). The intensity distribution of the transmitted beam is directly recorded by a charge coupled device or video camera(33) having an optical lens, such as a wide-angle objective lens, which is parallel to the HOE(32) and has the same optical axis as the laser beam (29). The intensity distribution is displayed on a monitor(35) through a computer(34) connected to the optical imaging device. The computer(34) varies the oscillation wavelength of a multi-wavelength laser(28), provides a scale suitable for the oscillation wavelength of the laser (28) through a scale generator (36), and displays the scale on the monitor(35) along with the images of the camera(33). The computer(34) displays all the characteristics about the measured HOE for each direction of the HOE.

The computer(34) can also be used to display and process the image from the camera(33), to calculate and display the characteristics of the HOE (32) from the image, to vary the oscillation wavelength of the laser(28) if necessary, to oscillate a scale corresponding to the laser's oscillation wavelength being used from the scale generator(36), and to fix the pattern of the scale to a desired position of the image by rotating the pattern of the scale.

By means of the simple apparatus of the present invention, the angular and spectral selectivities, the wavelength of maximum diffraction efficiency, and the spatial orientation of the grating vectors of a reflection-type HOE can be simultaneously measured in real time by illuminating the HOE with a diverging beam or a diffusive beam and then utilizing the dependence of the intensity distribution of the transmitted beam on the characteristics of the HOE.

Although particular embodiments of the present invention have been described in detail above, one of ordinary skill in the art would easily be able to accomplish modifications or variations of these that would be within the scope of the present invention as defined by the attached claims.

What is claimed is:

1. An apparatus for measuring characteristics of a reflective holographic optical element, the apparatus comprising:
    a source of a laser beam;
    a diffusive plate to diffuse the laser beam;
    a holographic optical element parallel to the diffusive plate;

an optical lens parallel to the holographic optical element;

an image projection screen parallel to the optical lens;

a means for detecting the laser beam passing through the diffusive plate, the holographic optical element, the optical lens, and the image projection screen, in that order; and a means for calculating the characteristics of the holographic optical element, connected to the beam detecting means, from an intensity distribution obtained from the beam detecting means.

2. The apparatus of claim 1, wherein the wavelength of the laser beam is less than or equal to the wavelength of a laser beam reflected from the holographic optical element normally illuminated by a laser.

3. The apparatus of claim 1, wherein the laser beam source has more than one tunable wavelength.

4. The apparatus of claim 1, wherein the laser beam is a collimated beam.

5. The apparatus of claim 1 or 3, wherein a diffusion angle of the laser beam diffused by the diffusive plate is greater than or equal to a numerical aperture of the optical lens.

6. The apparatus of claim 1 or 3, wherein a diffusion angle of the laser beam diffused by the diffusive plate is greater than or equal to an incident angle satisfying Bragg condition of the holographic optical element.

7. The apparatus of claim 1, 3, or 4, wherein the diffusive plate has a non-diffusive, transparent portion in the area illuminated by the laser beam, whose diameter is smaller than diameter of the laser beam.

8. The apparatus of claim 1, wherein the diffusive plate has the capability as a diffusing object of transmitting and diffusing the laser beam.

9. The apparatus of claim 1, 3, 4, or 8, wherein the laser beam that directly transmitted the diffusive plate matches the optical axis of the optical lens, becoming the center of an image displayed on the image projection screen.

10. The apparatus of claim 1, wherein the image projection screen has a scale board which comprises scales for the wavelength for the maximum diffraction efficiency, diffraction angle, and the ratio of angular and spectral selectivities.

11. The apparatus of claim 1, wherein the calculating means displays the laser beam images provided from the beam receiving means.

12. The apparatus of claim 1, wherein the image projection screen is located apart from the optical lens by its focal length.

13. An apparatus for measuring the characteristics of a reflection-type holographic optical element, the apparatus comprising:

a source of a laser beam;

a diffusive plate to diffuse the laser beam;

a holographic optical element parallel to the diffusive plate;

an optical lens parallel to the holographic optical element;

a means for detecting the laser beam passing through the diffusive plate and the holographic optical element, in that order;

a scale generator combined to the beam receiving means, for generating a scale suitable for the laser beam's oscillation wavelength; and a means for processing the laser beam images obtained from the beam receiving means.

14. The apparatus of claim 13, wherein the scale generator calculates the wavelength for the maximum diffraction efficiency, diffracting angle, and the ratio of angular and spectral selectivities at each wavelength used, and displays these values on the laser beam images in superposition.

15. The apparatus of claim 13, wherein the means for processing laser beam images has the functions to display and process the laser beam images obtained from the laser beam receiving means, to calculate and display the characteristics of the holographic optical element measured from the laser beam images, to control the scale generator to generate scales corresponding to the laser beam's oscillation wavelength at which the scale generator is used, and to fix a scale pattern in a desired position on the laser beam image by rotating the scale pattern.

16. The apparatus of claim 15, wherein the means for processing the laser beam image varies the oscillation wavelength of the laser beam source if necessary.

17. An apparatus for measuring characteristics of a reflection-type holographic optical element, the apparatus comprising:

a source of a laser beam;

a means for diverging the laser beam;

a holographic optical element parallel to the diverging means;

a image projection screen parallel to the holographic optical element;

a means for detecting the laser beam passing through the diverging means, the holographic optical element, and the image projection screen, in that order; and a means connected to the beam detecting means for calculating the characteristics of the holographic optical element from a laser beam image obtained from the beam detecting means.

* * * * *